3,306,772
SOLVENT AND PROCESS FOR OBTAINING
UNDEPOLYMERIZED AMYLOSES
Stig R. Erlander and Robert Tobin, Peoria, Ill., assignors to the United States of America as represented by the Secretary of Agriculture
No Drawing. Filed Apr. 3, 1964, Ser. No. 357,329
4 Claims. (Cl. 127—70)

A nonexclusive, irrevocable, royalty-free license in the invention herein described, throughout the world for all purposes of the United States Government, with the power to grant sublicenses for such purposes, is hereby granted to the Government of the United States of America.

This invention relates to a process for obtaining novel amyloses, i.e., amyloses that apparently have suffered no depolymerization inasmuch as they are characterized by having molecular weights that for any particular species greatly exceed the molecular weights of the prior art amyloses.

More specifically this invention relates to the employment of a novel solvent system that completely dissolves starches at room temperature without causing any recognizable depolymerization of the amylose and that can also be employed with the same results on protein-containing materials such as flours and corn meal.

Still more particularly this invention relates to the discovery that aqueous solutions containing per liter thereof about 5 moles of lithium thiocyanate and at least 1 mole but preferably 2.5 moles of guanidinium thiocyanate dissolve all varieties of starches at ambient temperature without causing depolymerization of the amylose which then can be fairly selectively and almost quantitatively precipitated from solution by critical concentrations of ethanol or acetone and then freeing the amylose of residual amylopectin by selectively complexing the former with amyl or butyl alcohols at a non-depolymerizing temperature of about 45° C.

Amyloses and especially "Dutch process" amylose obtained by dissolving potato starch in concentrated magnesium sulfate at 180° C. and selectively precipitating the amylose by cooling at 110° C. have been used to prepare edible films for certain foodstuffs. Inasmuch as the amylose content of potato starch is only about 23 percent, the potato amylose is more costly than the hydrocarbon film forming materials. It is generally recognized that the amylose must have a molecular weight of at least about 250,000 to provide films having good strength and high resistance to oils and gases.

More and more farmers are devoting acreage to strains of high amylose (amylomaize) corn whose starches predictably have "apparent" amylose values (by iodine absorption) of 40 percent and, depending on the specific genetic breed, up to about 80 percent, corresponding to an actual or recoverable amylose content of about 56–64 percent (80% of apparent value) by the Schoch amyl alcohol-complex method. Since our process is unique in being effective even on the very strongly bonded amylose of amylomaize starches and since large amounts of high amylose corn starch will soon be available, our process appears to have exceptional commercial potential.

Although laborious non-commercial fractionations under milder complex-forming conditions of amyloses obtained from amylomaize and ordinary starches by extended exposure to a complex-forming alcohol at about 100° C. (thus promoting degradation) by complexing or by cycles of freezing and thawing followed by high temperature leaching have demonstrated that the prior art molecular weight of about 300,000 or less for amylose from amylomaize and ordinary starch is an average produced by amyloses representing longer as well as shorter linear anhydroglucose polymer chains, there were no previous reference values to show that the accepted unfractionated (whole amylose) molecular weight and also those of the amylose fractions represented of the partially depolymerized amylose and not undepolymerized native amylose. Similarly, the prior art considers the average molecular weight of the unfractionated "native" amylose from potato starch to also be about 300,000, and that from ordinary (dent) corn starch to be about 250,000–300,000. The fact that our novel solvent system yields unfractionated amyloses that have markedly greater average molecular weights proves that the prior art amyloses are extensively depolymerized and that the amyloses obtained according to our invention are essentially native and undepolymerized. Although we previously found that saturated solutions of either lithium bromide or guanidinium chloride are somewhat similar to our present dual salt solvent solution in their ability to dissolve the amylose of ordinary starch, the said single salt solutions require fairly high temperatures that cause appreciable depolymerization and perhaps because of the greater content of amylose and the greater degree of internal bonding, dissolves only about 75 percent as much amylomaize amylose. Thus our process is felt to be most useful in connection with high amylose starch and in view of the phenomenal difference in molecular weight, also with potato starch. Although our process is operative on ordinary corn starch, which consists very largely of amylopectin and very little amylose, industry would have no interest in applying our process thereto unless an industrial need for extremely pure amylopectin is created.

The principal object of our invention is a process for obtaining high yields of the apparently undepolymerized native amyloses present in such starchy materials as amylomaize (high amylose) corn starch or meal, ordinary (dent) corn starch, potato starch, etc.

A more specific object is a process for obtaining whole (non-fractionated) amyloses having much higher average molecular weights than the corresponding prior art amyloses, the respective molecular weights of amyloses obtained by our process being ca. 380,000 for that from amylomaize starch having an apparent amylose content of 70 percent; ca. 1,700,000 for that from potato starch; and ca. 480,000 for amylose obtained from ordinary starch none of which starting materials were subjected to $SO_2$ steeping. It should be pointed out that any degradative treatment prior to our process will be reflected in a lower molecular weight.

The above and related objects will be more clearly understood by reference to the following specification and claims.

In accordance with the objects of our invention, we have now discovered that about 18 parts (dry basis) of a fully hydrated starch can be dispersed and gradually dissolved at room temperature without any recognizable depolymerization of the amylose in about 100 parts by weight of an aqueous solution containing per liter thereof 5 moles of lithium thiocyanate and from about 1 mole to about 2.5 moles (preferably the latter) of guanidinium thiocyanate and that the undepolymerized amylose can then be rather selectively obtained in high yields and in readily dissolvable form by adding sufficient ethanol to form a 23 percent by weight solution or enough acetone to form a 24 percent by weight solution thereof, warming to 45° C. to form a homogenous solution, cooling to room temperature, centrifuging, recipitating from 95 percent ethanol, and isolating the amylose free of amylopectin by forming a complex with the isomeric amyl alcohols or butanol at about 45° C.

Although best results are obtained when our novel solvent contains per liter 325 g. (5 moles) of LiSCN and 295 g. (2 moles) of guanidinium SCN, reasonably similar results are obtained with aqueous solutions containing 4–6 moles per liter of LiSCN along with 1–5 moles of guanidinium SCN. Much less preferably, one may substitute $CaCl_2$, $MgCl_2$, $MgBr_2$, or MgSCN (but not $MgSO_4$) for the LiSCN and guanidinium chloride or bromide for the guanidinium SCN.

Although we have successfully employed our novel solvent solution with potato starch, with ordinary corn starch, with several different hybrid corn starches, and even with a 70 percent apparent amylose amylomaize meal to obtain the varieties of amylose characterized by the described high molecular weights, the following typical example will illustrate the operation of our process.

*Example*

1.814 g. (dry basis) of hybrid corn starch having a previously determined apparent amylose content of 70 percent and actual amylose content of 56 percent, and obtained without the use of a $SO_2$ steep, was vigorously stirred in excess water until the granules swelled. Free water was removed by centrifugation, and to the fully hydrated starch containing 5.56 g. of water was added 10.3 g. of the 5 M LiSCN–2.5 M GSCN solution, thus providing a final starch concentration of 10.3 weight-percent (w./w.) or 11.5 percent (w./v.) (dry basis), the practical limit being about 15 percent (w./w.) because of the increases in viscosity on solution of the starch. The prior hydration of the granules is required to facilitate the required penetration of the granules by the solvent solution. After adjusting the pH to 7.0 and with frequent stirring, the granules were completely dissolved in a little over 3 hours to give a clear, highly viscous solution. Because of the high viscosity the addition of 5.26 g. of absolute ethanol to the 17.67 g. of solution to provide an amylose-precipitating ethanol concentration of 23 percent by weight resulted in a heterogenous solution and visible flocculation which was promptly resolved by warming the solution to about 45° C. with stirring. The tubes containing the clear, homogenous solution were then allowed to cool to room temperature and then spun for 10 minutes at 18,000 r.p.m. (39,000×G). The precipitate was dissolved in water and then reprecipitated in a large excess of 95 percent ethanol to provide 1.20 g. of material comprising 80.6 percent amylose. Upon subjecting the said material to aqueous complexing with commercial mixed amyl alcohols, there was obtained 0.97 g. of pure amylose (95.2% of theory) which was found to have a molecular weight of 381,000 by light scattering technique and intrinsic viscosity $[\eta]$ of 0.79 in water at pH 4.0.

Having disclosed our invention, we claim:

1. A process for obtaining undepolymerized amyloses that are characterized by greatly improved molecular weights comprising:
   (a) thoroughly hydrating an amylose-containing material selected from the group consisting of amylomaize starch, potato starch, dent corn starch, and corn meal;
   (b) adding thereto an amount of an aqueous solvent mixture containing per liter 5 moles of lithium thiocyanate and about 2.5 moles of guanidinium thiocyanate to provide a dispersion containing between about 10 percent and about 15 percent (dry basis) of said amylose-containing material;
   (c) adjusting the pH to 7.0;
   (d) stirring at room temperature for about 3 hours to completely dissolve said material;
   (e) adding absolute ethanol to provide a 23 percent by weight concentration thereof;
   (f) warming to about 45° C. to provide a homogenous dispersion;
   (g) allowing warmed solution to cool at room temperature;
   (h) centrifuging at about 39,000×gravity;
   (i) dissolving the precipitate in water and reprecipitating with excess 95 percent ethanol;
   (j) subjecting the precipitate to complex formation at 45° C. with mixed amyl alcohols and slowly cooling with stirring to obtain the pure undepolymerized amylose.

2. The process of claim 1 wherein the amylose-containing material is a hybrid corn starch having an apparent amylose content of 70 percent, and the obtained pure amylose is characterized by having a molecular weight of about 381,000.

3. The process of claim 1 wherein the amylose-containing material is potato starch, and the obtained pure amylose is characterized by having a molecular weight of about 1,700,000.

4. A composition of matter capable of dissolving starches at room temperature comprising an aqueous solution containing per liter thereof about 325 g. of lithium thiocyanate and about 295 g. of guanidinium thiocyanate.

No references cited.

MORRIS O. WOLK, *Primary Examiner.*

E. G. WHITBY, *Assistant Examiner.*